C. F. BLANKE.
CHINA COFFEE POT.
APPLICATION FILED DEC. 29, 1904.
909,528.
Patented Jan. 12, 1909.
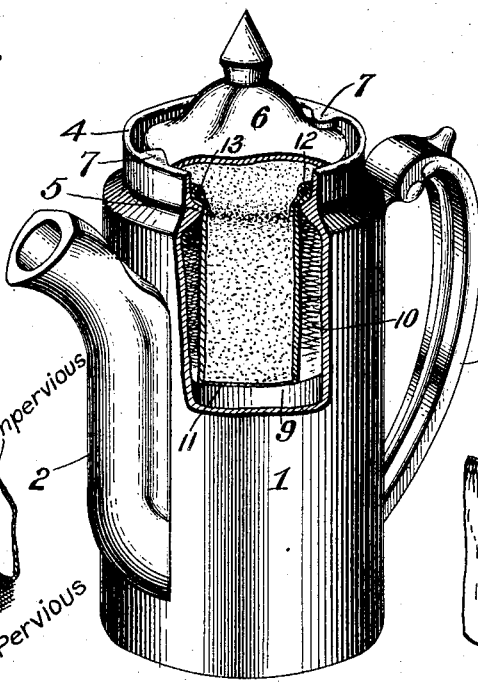
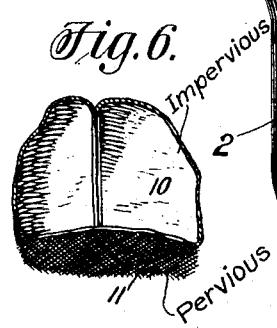
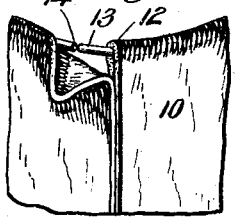
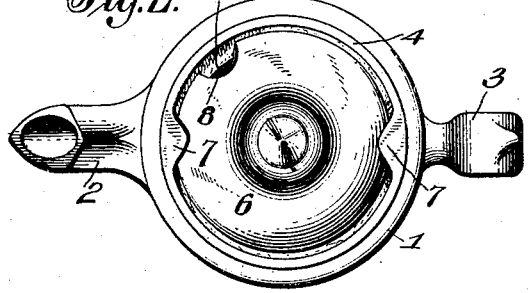
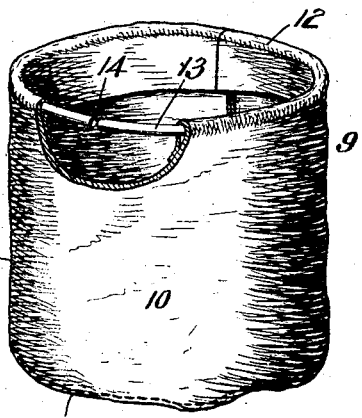
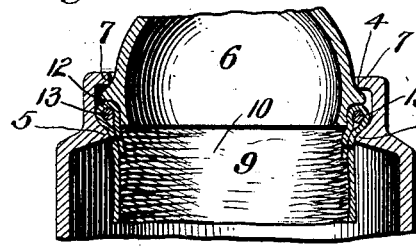
C. F. Blanke, Inventor

UNITED STATES PATENT OFFICE.

CYRUS F. BLANKE, OF ST. LOUIS, MISSOURI.

CHINA COFFEE-POT.

No. 909,528.　　　Specification of Letters Patent.　　　Patented Jan. 12, 1909.

Application filed December 29, 1904. Serial No. 238,830.

*To all whom it may concern:*

Be it known that I, CYRUS F. BLANKE, a citizen of the United States, residing at the city of St. Louis, in the State of Missouri, have invented a new and useful China Coffee-Pot, of which the following is a specification.

The invention relates to improvements in coffee pots.

The object of the present invention is to improve the construction of coffee pots, and to provide an all-china or earthen-ware drip coffee pot, having a drip or strainer bag held in place by the lid or cover of the coffee pot, and adapted to cushion the latter to prevent the same from being chipped.

Another object of the invention is to provide a coffee pot having a fabric strainer or drip bag, adapted to cause the hot water poured into it, to pass entirely through its bottom portion and through the coffee thereon, whereby the entire strength of the coffee will be extracted.

With these and other objects in view, the invention consists in the construction and novel combination and arrangement of parts, hereinafter fully described, illustrated in the accompanying drawing, and pointed out in the claims, hereto appended; it being understood that various changes in the form, proportion, size, and minor details of construction, within the scope of the claims, may be resorted to without departing from the spirit or sacrificing any of the advantages of the invention.

In the drawing:—Figure 1 is a perspective view of a coffee pot, constructed in accordance with this invention, one side being partly broken away to illustrate the arrangement of the drip or strainer bag. Fig. 2 is a plan view. Fig. 3 is a vertical sectional view of the upper portion of the coffee pot. Fig. 4 is a detail perspective view of the drip or strainer bag, the same being partly broken away to show the terminals of the aluminum ring. Fig. 5 is a detail view of a portion of the strainer bag, showing the open portion of the casing to permit the ring to be removed. Fig. 6 is a detail perspective view of another portion of the strainer bag, showing the loosely woven bottom, and the closely woven side walls, and illustrating the manner of securing the same together.

Like numerals of reference designate corresponding parts in all the figures of the drawing.

1 designates the body of a coffee pot, designed to be constructed of china or earthenware to prevent it from being affected by the acid in the coffee. The coffee pot, which is provided at its front with a spout 2, and at its back with a handle 3, has an upwardly-projecting flange 4 at the top, from the base of which extends an interiorly-arranged ledge 5. The ledge is adapted to support the lid or cover 6 of the coffee pot, and the said lid or cover is retained in place by a pair of oppositely-disposed segmental lugs 7, extending inwardly from the upper edge of the vertical flange 4 at diametrically opposite points. The lid or cover is provided with a segmental notch or recess 8 to enable it to be readily placed on and removed from the coffee pot. In placing the cover on the coffee pot, one side is introduced beneath one of the lugs, and the notch is arranged at the other lug to permit the lid or cover to pass the same. When the lid or cover is in position, it is partially rotated to carry the notch away from the lug. The lid or cover is partially rotated to bring the notch back to the lug when it is desired to remove it from the coffee pot. The ledge also forms a support for a percolator or strainer bag 9, having its side walls 10 constructed of heavy closely-woven muslin, or other suitable fabric, while the bottom 11 of the strainer bag is constructed of thin loosely-woven muslin. The closely-woven muslin sides are almost water-tight, whereby the water used in making drip coffee is caused to pass through the coffee, thereby extracting all the strength from the same. The coffee is placed upon the bottom of the strainer or drip bag, and the hot water is poured into the latter until the same is nearly full, care being taken to prevent the water from flowing over the top of the bag. The cover is replaced while the coffee is dripping, and the operation is repeated until the desired amount of hot water has been poured into the coffee pot.

The bag is provided at its top with a casing 12, for the reception of an expansible aluminum ring 13, which has its ends 14 disconnected, whereby it is adapted to be readily compressed to introduce it into the coffee pot, and when arranged on the ledge, it will expand and hold itself firmly thereon. It is positively locked on the ledge or flange when the cover or lid is in place. It is also adapted to form a cushion for the cover or lid to prevent the same and the body of the coffee pot from being chipped when placing the lid or cover on and removing it from the body while making coffee. It also acts as a packing to maintain a tight joint and prevent the escape of the aroma of the coffee. The aluminum ring will not corrode, and in practice, the casing of the strainer or drip bag will be left open adjacent to the terminals to permit the latter to be readily removed to facilitate washing the bag.

It will be seen that the coffee pot, which is exceedingly simple and inexpensive in construction, is not affected by the acid in the coffee, and is perfectly sanitary, as it may be easily and thoroughly cleaned after using. Furthermore it will be clear that when it is necessary to replace the strainer bag, a new one can be readily made by any one, as it is only necessary to form a casing at the top of a closely woven strip of material, stitch the ends of the same together, and then stitch the loosely woven bottom to the lower edges of the closely woven strip.

Having thus fully described my invention, what I claim as new, and desire to secure by Letters Patent, is:—

1. A percolator formed entirely of textile fabric having a pervious bottom and relatively impervious sides.

2. A percolator formed entirely of textile material the material of its sides being relatively impervious to water.

3. A percolator formed entirely of textile material having a loosely woven bottom and closely woven sides.

4. A drip or strainer bag composed of flexible vertical side walls of heavy closely woven substantially water tight fabric, and a relatively thin flexible horizontal bottom of loosely woven fabric adapted to permit a liquid to flow freely through it, whereby all the liquid poured through the strainer bag is caused to pass through the coffee lying upon the thin horizontal bottom.

5. The combination with a coffee pot having an interiorly arranged ledge, of a drip or strainer bag composed of flexible vertical side walls of heavy closely woven substantially water tight fabric, and a relatively thin flexible horizontal bottom of loosely woven fabric adapted to permit a liquid to flow freely through it, whereby all the liquid poured through the strainer bag is caused to pass through the coffee lying upon the thin horizontal bottom, said bag being provided at the upper edges of its side walls with a casing, an expansible ring arranged within the casing and holding the upper edges of the bag upon the supporting ledge of the coffee pot and having its terminals disconnected to permit its removal from the casing, and a cover interlocked with the coffee pot and cushioned by the casing of the drip or strainer bag.

In testimony, that I claim the foregoing as my own, I have hereto affixed my signature in the presence of two witnesses.

CYRUS F. BLANKE.

Witnesses:
Jas. L. Post,
Will Daurinheim.